United States Patent
Randal (10) Patent No.: US 10,584,044 B2
(45) Date of Patent: Mar. 10, 2020

(54) SYSTEM AND METHOD FOR REMOVING IRON FROM WASTE WATER

(71) Applicant: Amperage Energy Inc., Cochrane (CA)

(72) Inventor: Chad Allen Randal, Cochrane (CA)

(73) Assignee: Amperage Energy Inc., Cochrane, AB (CA)

(*) Notice: Subject to any disclaimer, the term of this patent is extended or adjusted under 35 U.S.C. 154(b) by 184 days.

(21) Appl. No.: 15/459,712

(22) Filed: Mar. 15, 2017

(65) Prior Publication Data

US 2017/0267561 A1    Sep. 21, 2017

Related U.S. Application Data

(60) Provisional application No. 62/308,509, filed on Mar. 15, 2016.

(51) Int. Cl.
| | |
|---|---|
| C02F 1/72 | (2006.01) |
| B01D 21/00 | (2006.01) |
| C02F 1/00 | (2006.01) |
| C02F 1/76 | (2006.01) |
| C02F 1/78 | (2006.01) |
| B01D 21/24 | (2006.01) |
| C02F 101/20 | (2006.01) |
| C02F 103/10 | (2006.01) |

(52) U.S. Cl.
CPC .......... *C02F 1/722* (2013.01); *B01D 21/0009* (2013.01); *C02F 1/72* (2013.01); *B01D 21/0012* (2013.01); *B01D 21/0018* (2013.01); *B01D 21/2494* (2013.01); *C02F 1/004* (2013.01); *C02F 1/727* (2013.01); *C02F 1/76* (2013.01); *C02F 1/78* (2013.01); *C02F 2001/007* (2013.01); *C02F 2101/203* (2013.01); *C02F 2103/10* (2013.01)

(58) Field of Classification Search
CPC ....................................................... C02F 1/722
See application file for complete search history.

(56) References Cited

U.S. PATENT DOCUMENTS

| | | | | |
|---|---|---|---|---|
| 4,447,330 | A | * | 5/1984 | Babineaux, III .......... C02F 9/00 166/267 |
| 6,033,901 | A | * | 3/2000 | Powell, Jr. ............. B01D 17/00 134/19 |

(Continued)

*Primary Examiner* — Peter Keyworth
(74) *Attorney, Agent, or Firm* — Cesari and McKenna, LLP (57) ABSTRACT

Systems and methods for removing iron from waste water employ one or more oxidizers, one or more treatment tanks having one or more self-generating and self-sustaining active sludge layers, and one or more spray-atomizing devices. A mixture of flowback fracturing water, or produced water, and the one or more oxidizers is spray-atomized by the spray-atomizing device inside the one or more treatment tanks. The atomized mixture settles in the one or more treatment tanks resulting in one or more self-generating and self-sustaining active sludge layers and one or more treated solutions. Additional mixtures of the flowback fracturing water, or produced water, and the one or more oxidizers may be continually spray-atomized into the one or more treatment tanks and filtered by the one or more sludge layer(s) so as to remove precipitated iron species from accumulated distillates and produce additional treated solutions for collection in one or more finish tanks.

13 Claims, 4 Drawing Sheets

(56) References Cited

U.S. PATENT DOCUMENTS

| | | | | |
|---|---|---|---|---|
| 9,809,478 B2* | 11/2017 | Randal | .................... | C02F 9/00 |
| 2011/0198297 A1* | 8/2011 | Ubri | .................... | C02F 1/74 |
| | | | | 210/722 |
| 2014/0120018 A1* | 5/2014 | Berger | .................... | B01D 53/70 |
| | | | | 423/245.1 |
| 2014/0374104 A1* | 12/2014 | Seth | .................... | C02F 1/725 |
| | | | | 166/305.1 |
| 2016/0097247 A1* | 4/2016 | Marco | .................... | B01D 29/62 |
| | | | | 166/308.1 |

\* cited by examiner

FIG. 4 ved a US 10,584,044 B2

SYSTEM AND METHOD FOR REMOVING IRON FROM WASTE WATER

CROSS-REFERENCE TO RELATED APPLICATIONS

The present application claims the benefit of U.S. Provisional Patent Application Ser. No. 62/308,509, which was filed on Mar. 15, 2016, by Chad Allen Randal for SYSTEM AND METHOD FOR REMOVING IRON FROM WASTE WATER, which is hereby incorporated by reference in its entirety.

BACKGROUND

Technical Field

This application relates generally to systems and methods for treating waste water, and more particularly to systems and methods for removing iron from waste water, including produced water and flowback fracturing water.

Background

Oil and gas exploration and recovery typically generate large amounts of contaminated water, such as flowback fracturing water and produced water. Flowback fracturing water, or flowback water, is water that is returned to the surface of a hydraulic fracturing site after it has been injected into shale beds to fracture the shale. Produced water is water that occurs naturally and may flow to the surface of a well throughout the lifespan of the well. Flowback water is unique to hydraulic fracturing and may comprise clays, chemical additives, hydrocarbons, dissolved metal ions (e.g. $Fe^{2+}$ and $Fe^{3+}$), naturally occurring radioactive materials (e.g. radium) and total dissolved solids (TDS). Produced water typically comprises high levels of dissolved metal ions (e.g. $Fe^{2+}$ and $Fe^{3+}$) and TDS such as barium, calcium, iron and magnesium. Produced water may also contain hydrocarbons and naturally occurring radioactive materials.

Many of the chemicals in flowback water and produced water may interfere with any subsequent reuse of the water and should be filtered prior to reuse. For example, iron may lead to corrosion and clogging of equipment, clogging of downhole formations, an increased need for additive chemicals, and membrane fouling (e.g. filters). Iron levels in flowback water and produced water may also be subject to regulation by government authorities.

SUMMARY

Current techniques for removing iron from flowback and produced water include aeration, membrane filtration and ion exchange. However, these techniques are expensive (e.g. require the use of filters), are overly complicated and difficult to use, and do not provide adequate flow-through to maintain efficient processing of the flowback or produced water. Some current techniques are also extremely dangerous as they require the injection of air (or certain gases) into the system, thus increasing the risk of explosions. Thus, there remains a need in the art for systems and methods to remove iron from flowback and produced water that are affordable, easy to use, efficient and safe.

There are presented herein new systems and methods for removing iron from flowback and produced water. The systems and methods employ one or more oxidizers, one or more treatment tanks having one or more active sludge layers, and one or more dispersion devices attached to the one or more treatment tanks.

Flowback fracturing water or produced water is mixed with the one or more oxidizers and pumped into the one or more treatment tanks through one or more dispersion devices attached thereto. The one or more dispersion devices spray-atomize the mixture into minute globules (e.g. a fog, a mist or the like) inside the one or more treatment tanks. The atomized mixtures settle and form a layer of active sludge and a treated solution in each the one or more treatment tanks.

Additional mixtures of flowback fracturing water or produced water may then be atomized into the one or more treatment tanks where they interact with the active sludge layer (as minute globules or accumulated distillate) thereby removing various iron species from the additional mixtures and producing more treated solutions. The active sludge layer is self-generating and self-sustaining and continues to treat the contaminated water as more mixtures are cycled through the one or more treatment tanks.

BRIEF DESCRIPTION OF THE DRAWINGS

The description below refers to the accompanying drawings, of which.

DETAILED DESCRIPTION OF AN ILLUSTRATIVE EMBODIMENT

Systems and methods of operating the systems for removing iron from flowback fracturing water and produced water are discussed in more detail in the illustrative embodiments below. Such methods and apparatuses are merely illustrative and should not be considered as limiting.

Figure 1:
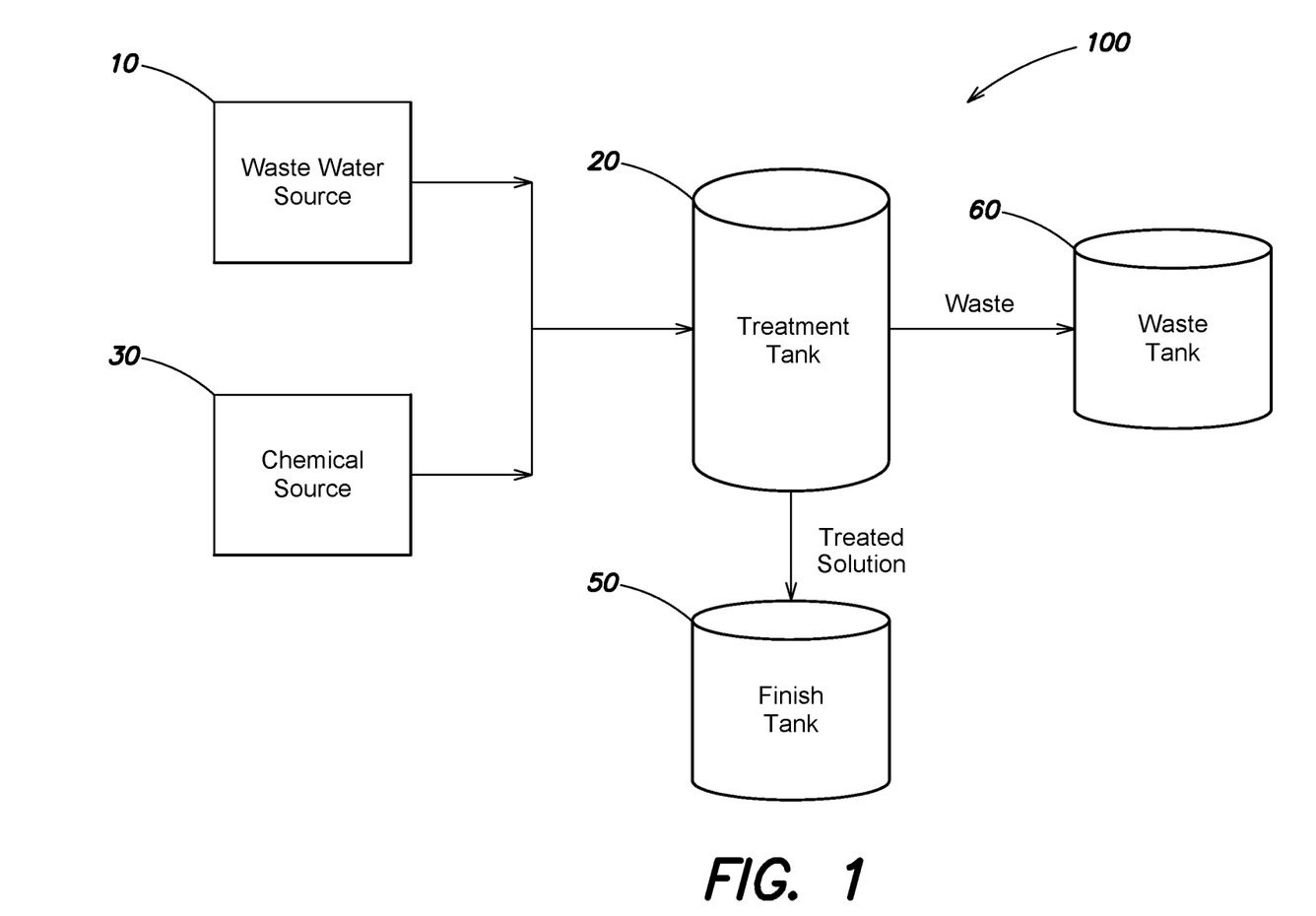
FIG. 1 is a high level functional diagram of an illustrative embodiment of the systems and methods.

In the high level illustrative embodiment of FIG. 1, a system 100 includes a waste water source 10 comprising flowback fracturing water and/or produced water. The waste water source 10 may be any unit capable of receiving and/or holding waste water for supply to one or more treatment tanks (e.g. a tank, well, industrial output system, etc.). The waste water flows from the waste water source 10 to a treatment tank 20. As the waste water is pumped to the treatment tank 20, one or more oxidizers (e.g. hypochlorites, ozone, oxygen, chlorites, permanganates, peroxides, persulfates, perborates, precarbonates, N-halogenated hydantoin, chlorine dioxide, peracetic acid, etc.) from a chemical source 30 are pumped to the treatment tank 20, thereby mixing with the waste water and oxidizing various chemicals in the waste water and stimulating the subsequent precipitation of these oxidized chemical species out of the waste water as, for example, iron(II) and iron(III) oxides. As discussed in more detail in the illustrative embodiments of FIGS. 2 and 3 below, the waste water is then further treated in the treatment tank 20. A treated solution is collected in a finish tank 50 and waste is collected in a waste source 60.

Figure 2A:
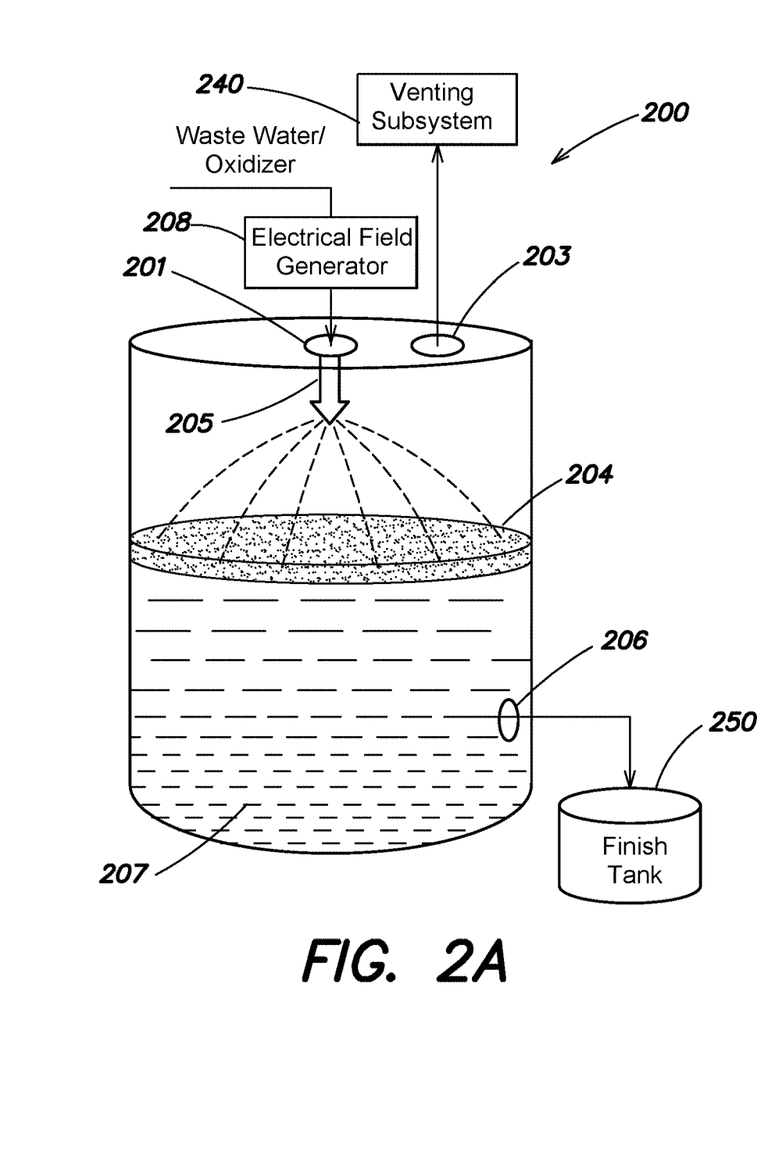
FIGS. 2A-B are enlarged views of treatment tanks of illustrative embodiments of the systems and methods.

FIG. 2A is a more detailed illustrative embodiment of a treatment tank 200 of the systems and methods. A mixture of waste water (comprising flowback fracturing water and/or produced water) and one or more oxidizers is pumped through an inlet 201 to a device 205 attached to the treatment tank 200. An electrical field generator 208 may be utilized to assist in ionizing the mixture of waste water and one or more oxidizers. For example, the electrical field generator 208 may be wrapped around or attached to the pipe(s) that carry the waste water, oxidizers, and/or mixture to the treatment tank 200. The device 205 spray-atomizes the mixture into the inside of the treatment tank 200 as minute globules (e.g. mist, fog or the like), thus vigorously and robustly mixing the one or more oxidizers with the waste water and promoting further oxidation of any iron species in the mixture. In addition, this atomization greatly increases the surface area and exposure of the mixture to existing air within the treatment tank 200, which significantly increases the absorption of oxygen into the atomized solution, thus further oxidizing and/or catalyzing the oxidation of the iron species in the atomized mixture. The spray-atomization of the illustrative embodiments may obviate or at least greatly reduce any need for the injection of air into iron contaminated water to, for example, aerate and/or promote redox reactions.

After the mixture is spray-atomized into the treatment tank 200, the minute globules coalesce as a distillate to fill the treatment tank 200. The liquid in the tank is then settled so as to generate treated water 207 and a sludge layer 204, which comprises waste from the waste water, such as various iron species. The treated water 207 is then collected from the treatment tank 200 and pumped out of a lower outlet 206 to the finish tank 250. The sludge layer 204 remains in the treatment tank 200. In the illustrative embodiment of FIG. 2A, the treated water 207 lies below the floating sludge layer 204. However, in other embodiments, the treated solution(s) 207 may lie above the sludge layer(s) in the treatment tank(s). It is noted that floatable material, such as a hydrocarbon or a low-density matter, may be added to the to the sludge layer 204.

Gases may be removed (by pumping or venting) through outlet 203 to a ventilation subsystem 240 for further processing, release and/or storage. Additional mixtures of waste water and one or more oxidizers are spray-atomized through the device 205 into the treatment tank 200. The minute globules of the additional spray-atomized mixture and coalesced distillate contact the sludge layer 204 and various iron species are absorbed into the sludge layer 204 and/or any agglomerated iron and/or hydrocarbons is filtered out of the distillate by the sludge layer 204 to produce more sludge and additional treated solutions. The additional treated solutions flow out of the lower outlet 206 to the finish tank 250.

Figure 2B:
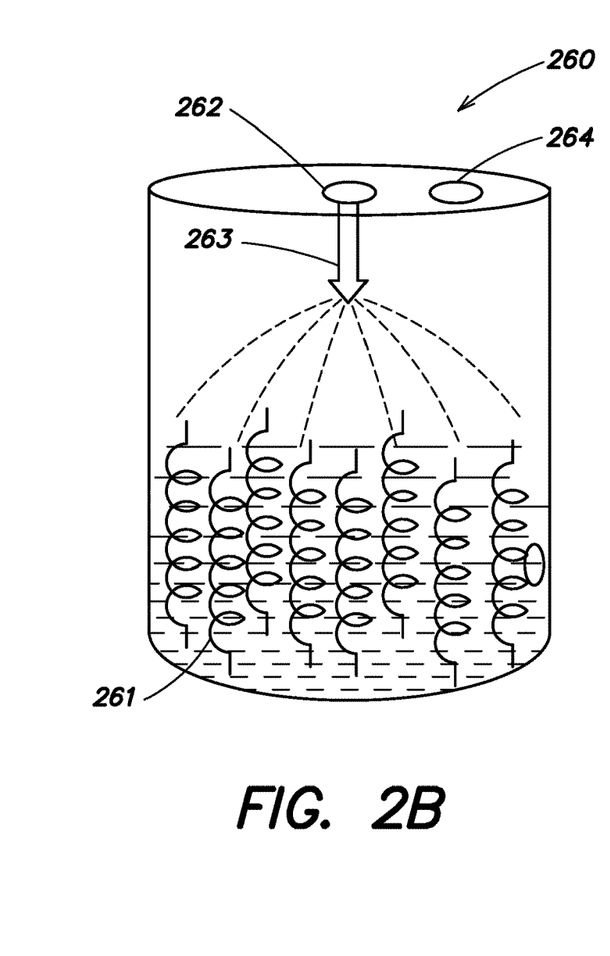

In the illustrative embodiment of FIG. 2B, a treatment tank 260, similar to treatment tank 200, includes inlet 262 and device 263, and outlet 264. In addition, treatment tank 260 includes eight helical coils 261 attached to a bottom of the treatment tank 260 that extend vertically. In an illustrative embodiment, the helical coils 261 extend vertically to approximately a midway point of the tank 260. The helical coil units 261 increase the surface area within the treatment tank 260 and facilitate the precipitation and agglomeration of iron species and/or hydrocarbons out of the waste water. The helical coils may include electric field generators (not shown) to assist in ionization. In other embodiments, the treatment tanks may include one or more internal attachments of various numbers, shapes, and sizes.

Figure 3:
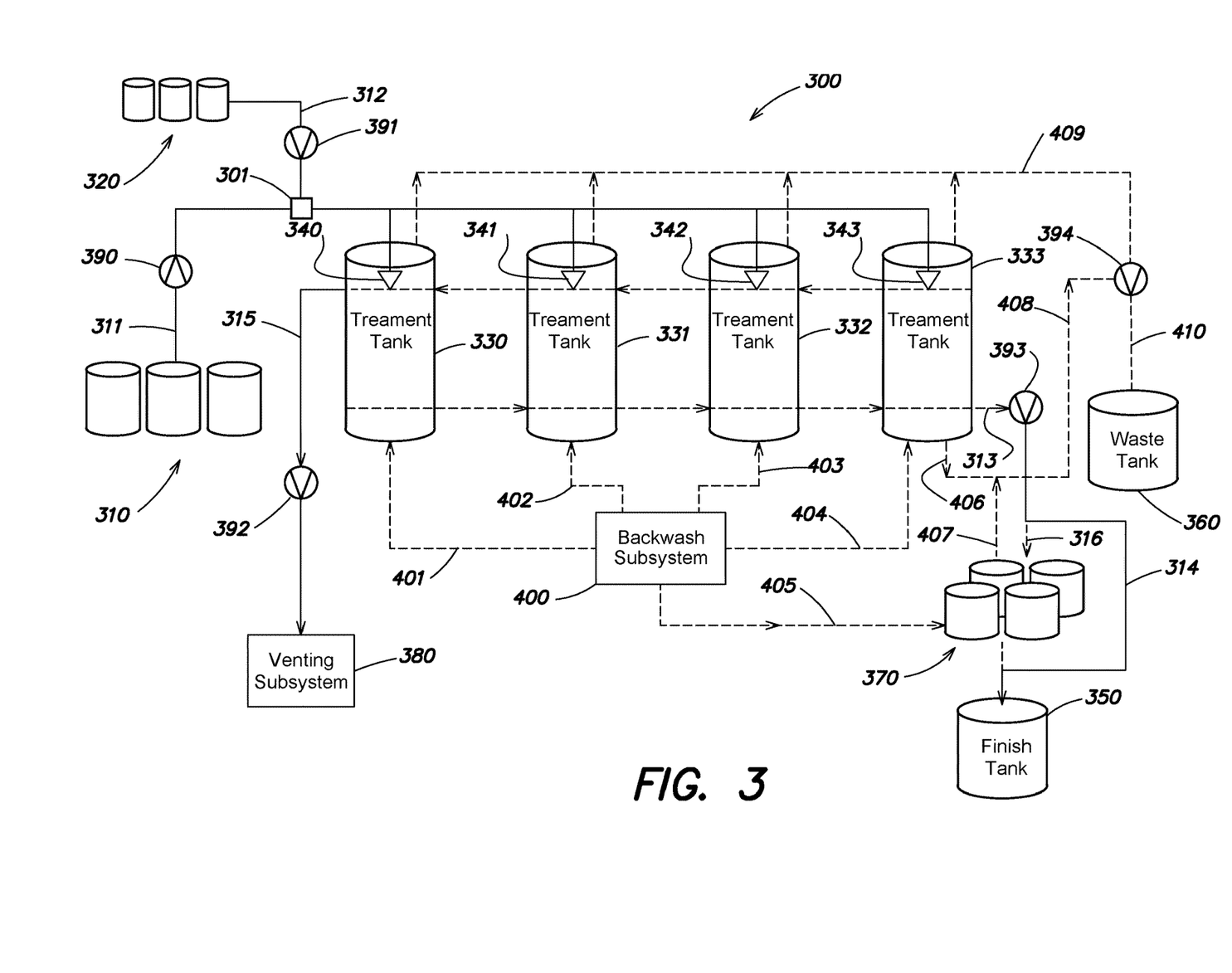
FIG. 3 is a functional diagram of an illustrative embodiment of the systems and methods.

Referring now to the illustrative embodiment of FIG. 3, a system 300 includes three waste water source tanks (collectively tanks 310) each filled with flowback fracturing water; three oxidizer source tanks (collectively tanks 320); treatment tanks 330, 331, 332 and 333; a finish tank 350; a waste tank 360; an optional filter subsystem 370 (including four filters); a venting subsystem 380; an optional backwash subsystem 400; a plurality of pipes, including pipes 311-316 and 401-410; and a plurality of pumps, including pumps 390-394.

Each of the treatment tanks 330, 331, 332 and 333 are illustratively capable of holding 40 m$^3$ of fluid and are interconnected with each other by a belly line 313 extending across and through lower portions of each of the treatment tanks 330, 331, 332 and 333. The treatment tanks 330, 331, 332 and 333 are also illustratively closed/sealed (e.g. hermetically) and maintained at about 0-1 atm, and, more specifically, at 0 atm, throughout the treatment process by operation and coordination of one or more of the pumps 390-394. Maintaining a closed system within the treatment tanks illustratively helps reduce the risk of explosion from the ignition of flammable vapors released during the treatment process. However, assuming sufficient safety protocols are in place, other embodiments may include one or more treatment tanks that are open to the atmosphere.

In the illustrative embodiment of FIG. 3, the system 300 operates in three phases. In Phase 1, waste water is pumped by the pump 390 through the pipe 311 to a junction 301 where the waste water mixes with an oxidizer (e.g. hypochlorites, ozone, oxygen, chlorites, permanganates, peroxides, persulfates, perborates, precarbonates, N-halogenated hydantoin, chlorine dioxide, peracetic acid, etc.) being pumped from tanks 320 by pump 391 through the pipe 312 to the junction 301. The mixture of the oxidizer and waste water is pumped by the pumps 390 and 391 to each of the treatment tanks 330, 331, 332 and 333. As the oxidizer mixes with the waste water, chemicals and organics, including iron(II) oxides, iron(III) oxides and hydrocarbons, precipitate out of the waste water. In one implementation, for example, an oxidizer of sodium hypochlorite of a concentration of between 12% and 16% is effective. Also effective, and another example of an oxidizer, is a stabilized chlorine dioxide solution.

The mixture of the oxidizer and waste water (and any oxidized and precipitated chemicals) flows to devices 340, 341, 342, and 343, which are attached to each of the treatment tanks 330, 331, 332 and 333, respectively. The devices 340, 341, 342 and 343 spray-atomize the mixture of the oxidizer and the waste water as a vapor/mist into the respective treatment tanks, thus further stimulating oxidation and subsequent precipitation of waste out of the waste water as, for example, iron(II) and iron(III) oxides and hydrocarbons. The mist collects and condenses within the treatment tanks 330, 331, 332 and 333.

Illustratively and after each of the treatment tanks 330, 331, 332 and 333 are filled to about 70% full, Phase 2 begins and the flow of waste water and oxidizer into the treatment tanks is paused by, for example, stopping the pumping of waste water and oxidizer to the treatment tanks 330, 331, 332 and 333 and/or closing one or more valves (not shown). The solutions in the treatment tanks are then allowed to settle for a predetermined amount of time, which in the illustrative embodiment of FIG. 3, is about 40-90 minutes.

During the settling, sedimentation/precipitation yields a Phase 2 treated solution (not shown) and about 8-10 m$^3$, preferably 10 m$^3$, of a self-generating and self-sustaining active sludge layer (not shown in FIG. 3 but shown in FIG. 2A) in each of the treatment tanks 330, 331, 332 and 333. These active sludge layers may be located at the same or different heights/levels within the respective treatment tanks and comprise various chemical species removed from the waste water, including iron-containing species and hydrocarbons.

Once the solutions have settled in the treatment tanks 330, 331, 332 and 333 and active sludge layers have formed, Phase 2 is complete and Phase 3 begins. The pumps 390 and 391 resume pumping the waste water and oxidizer(s) to the treatment tanks 330, 331, 332 and 333 as the pump 393 pumps the Phase 2 treated solution out of the treatment tanks 330, 331, 332 and 333 to the finish tank 350 through the belly line 313 and the pipe 314. In each of the treatment tanks 330, 331, 332 and 333, the minute globules of the additional spray-atomized mixtures, and the coalesced solutions thereof, are actively absorbed and/or filtered by the active sludge layers, thus removing waste containing iron (and hydrocarbons) from the additional mixture and yielding Phase 3 additional treated solutions and additional sludge in the sludge layer. The Phase 3 solutions are continuously pumped to the finish tank 350 through the belly line 313 and the pipe 314, while additional mixtures of waste water and oxidizer(s) continue to be pumped to, and spray atomized into, each of the treatment tanks 330, 331, 332 and 333.

At the end of treatment (or intermittently throughout treatment) the sludge layers containing waste (e.g. iron oxides, hydrocarbons, etc.) may be removed from the treatment tanks 330, 331, 332 and 333 in a number of different ways. For example, waste (sludge) may be periodically skimmed out of each of the treatment tanks 330, 331, 332 and 333 at any time during the treatment process or after the treatment process has ended. Alternatively, waste (sludge) may be removed from the treatment tanks 330, 331, 332 and 333 by backwashing the system 300 with the backwash subsystem 400. The backwash subsystem 400 may pump a backwash solution (e.g. NaCl solution) into bottoms of each of the treatment tanks 330, 331, 332 and 333 through the pipes 401-404, respectively. The pump 394 would then pump the backwashed solution (and waste) out of the tops of each of the treatment tanks 330, 331, 332 and 333 and through the pipes 409 and 410 to the waste tank 360. The pump 394 may also pump backwash solution and waste out of the bottom of the treatment tank 333 and through the pipes 406, 408, and 410 to the waste tank 360.

In the illustrative embodiment of FIG. 3, the treated solutions in the treatment tanks 330, 331, 332 and 333 may also be filtered by the filter subsystem 370 when, for example, the amount of particulate in the treated solutions is above a desired level. In such instances, the pump 393 pumps the treated solutions through a pipe 316 and to the filter subsystem 370 where particulate matter is removed by filtering through two 5 µm backwash capable filters (or backwash capable resin beds) and two 1-5 µm backwash capable melt blown filter cartridges. In other embodiments, the amount, type, arrangement and size of filters may vary, such as, for example, using only one filter of backwash capable resin beads. The filtered, treated solution(s) can then be pumped to the finish tank 350.

Optionally, the filter subsystem 370 can be backwashed by the backwash subsystem 400. For example, the backwash subsystem 400 may pump backwash solution through the pipe 405 and through the one or more of the filters of the filter subsystem 370. The pump 394 may then pump the backwashed solution and any waste from the filter subsystem 370 through pipe 407, 408, and 410 to the waste tank 360. The active sludge layers of the system and methods, however, may reduce and even obviate the need for filters during the treatment of flowback or produced water. For example, the active sludge layer(s) is formed from the initial spray atomized mixture(s) of waste water and oxidizer(s) and is, therefore, self-generating. Moreover, the sludge layer(s) is self-sustaining because the active sludge layer(s) continues to filter out and collect waste from the treatment of additional mixtures that are spray-atomized into the treatment tank(s), thus also sustaining an adequate amount of sludge in the sludge layer(s).

The system 300 may also use the venting subsystem 380 to remove and/or treat any gases and vapors released in the treatment tanks 330, 331, 332 and 333 during Phases 2 and 3 of the treatment processes. The pump 392 pumps these gases and vapors from the treatment tanks 330, 331, 332 and 333 through the pipe 315 and to the venting subsystem 380, which may then vent the gases and vapors to the atmosphere, store gases and/or may treat the gases and vapors by, for instance, running the gas through a scrubber tank (not shown) and removing certain unwanted chemical species from the gases and vapors. Because the treatment tanks 330, 331, 332 and 333 are interconnected with each other by one or more pipes (not labeled) that run across tops of the treatment tanks 330, 331, 332 and 333, the pump 392 pulls gases and vapors directly from the treatment tank 330 and indirectly from the treatment tanks 331, 332 and 333. In some embodiments, the treatment tanks may not be interconnected with each other, or only partially interconnected with each other, and the gases and/or vapors in each of these treatment tanks may be separately pulled/pumped-out from gases and/or vapors in the other treatment tanks(s).

Some embodiments of the methods and systems which include two or more treatment tanks may employ continuous treatment processing or batch treatment processing. In continuous treatment processing, all of the treatment tanks are simultaneously filled with solution and allowed to settle so as to promote sedimentation/precipitation and the formation of Phase 2 treated solutions and self-generating and self-sustaining active sludge layers. After settling, the Phase 2 treated solutions are then pumped to one or more finish tanks while new mixtures of waste water and oxidizer(s) are pumped and misted into the two or more treatment tanks.

By contrast, in batch treatment processing, a mixture of waste water and oxidizer are pumped into at least one of the two or more treatment tanks and allowed to settle before the mixture is spray atomized into any of the other treatment tanks. After settling and formation of an active sludge layer in the at least one treatment tank, a Phase 2 solution from this treatment tank is pumped to one or more finish tanks. At the same time, additional mixtures of waste water and oxidizer(s) are spray atomized into the other treatment tank(s) for settling and formation of active sludge layers and Phase 2 treated solutions. Once Phase 2 is concluded in any of the treatment tanks (and active sludge layers exist in these tanks), the step of atomizing waste water and oxidizer(s) into these treatment tanks resumes and Phase 3 treated solutions are continuously pumped to the one or more finish tanks.

Figure 4:
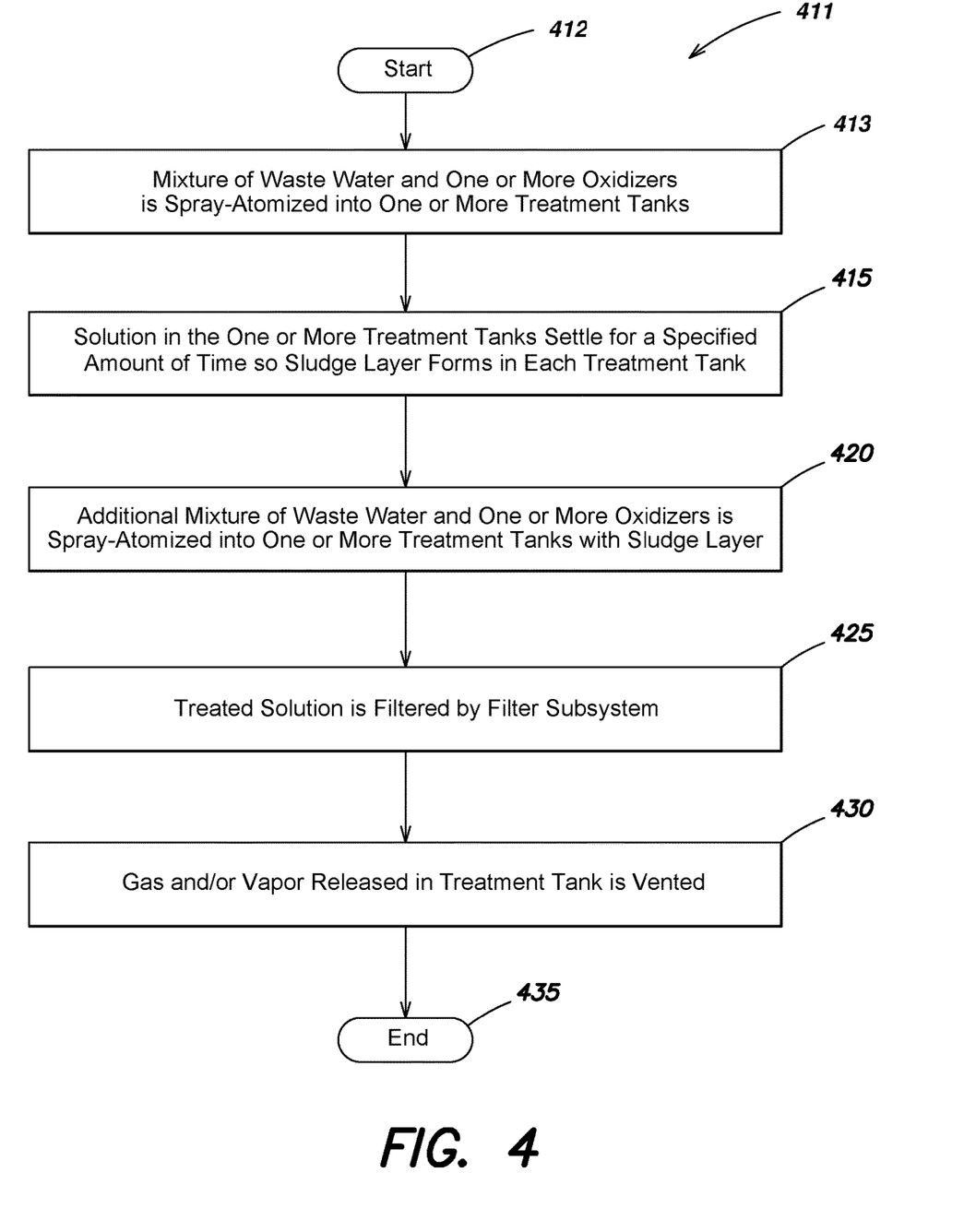
FIG. 4 is an example flow chart for the operation of the systems and method of FIG. 1.

FIG. 4 is an example flow chart of the operation of the system and method for removing iron from waste water. The procedure 411 starts at step 412 and continues to step 413, where a mixture of waste water (e.g., fracturing water and/or produced water) and one or more oxidizers is spray-atomized by a device into one or more treatment tank. The one or more oxidizers may be, but are not limited to, hypochlorites (e.g., sodium hypochlorite or calcium hypochlorite), ozone, oxygen, chlorites, permanganates, peroxides, persulfates, perborates, precarbonates, N-halogenated hydantoin, chlorine dioxide, peracetic acid, etc. The procedure continues to step 415, where the solution in the one or more treatment tanks settle for predefined amount of time so that a sludge layer forms in each of the one or more treatment tanks. Specifically, and during the settling, the flow of waste water and oxidizer into the one or more treatment tanks is paused and minute globules coalesce as a distillate to fill the one or more treatment tanks. The liquid in the tank is then settled to generate treated water and a sludge layer. The sludge layer comprises waste from the waste water, such as, but not limited to, various iron species. The treated water may be pumped to a finish tank.

The procedure continues to step 420, where an additional mixture of waste water and one or more oxidizers is spray-atomized into the one or more treatment tanks with the sludge layer. The minute globules of the additional spray-atomized mixture, and the coalesced solutions thereof, get actively absorbed and/or filtered by the sludge layer in the treatment tank thus removing waste containing iron (and hydrocarbons) from the addition mixture to yield addition treated solutions and additional sludge layer. Advantageously, the sludge layer in the treatment tank is self-generating, self-sustaining, and increases in volume and continues to treat the waste water as more mixtures are cycled through the treatment tank.

It is noted that as more treated solution is produced, the treated solution may be pumped to the finish tank. In addition, the sludge layer may be removed in a number of different ways. For example, the sludge layer may be skimmed out of the treatment tank at any time during or after the treatment processor. Alternatively, the sludge may be removed from the treatment tank by pumping a backwash solution from a backwash system and through the treatment tank, wherein the backwash solution (that includes the sludge) may be then pumped to a waste tank.

In certain embodiments, and at step 425, the treated solution is filtered by a filter subsystem. For example, and when the amount of particulate in the treated solution is above a desired level or a threshold value, the treated solution may be pumped to the filter subsystem to remove the particulate matter from the treated solution. It is noted that the filter subsystem may be backwashed by pumping a backwash solution from the backwash system through the filter subsystem, wherein the backwash solution may be then pumped to a waste tank.

In certain embodiments, and at step 430, gases and/or vapors released in the treatment tank is vented. Specifically, the gases and/or vapors may be pumped from the treatment tank to a venting subsystem, which may then vent the gases and/or vapors to the atmosphere, store the gases and/or vapors, and/or treat the gases and/or vapors by, for example, running the gases and/or vapors through a scrubber tank (not shown) and removing certain unwanted chemical species from the gases and/or vapors. The procedure then ends at step 435.

The foregoing description has been directed to specific embodiments. It will be apparent, however, that other variations and modifications may be made to the described embodiments, with the attainment of some or all of their advantages. For example, other embodiments of the systems and methods may include additional filters, treatment tanks, chemical tanks, pumps, finish tanks, waste tanks, venting subsystems (or associated components), backwashing subsystems (or associated components), backwashing sources, waste water sources and oxidizers. The systems and methods may also include various valves located at certain points in the systems and coordinated to direct the flow of certain fluids and/or the effectiveness of certain pumps.

The types of waste water sources and means for collecting waste and treated solution collected during the treatment process may also vary in other embodiments of the systems and methods. For example, some embodiments may treat waste water from a well or factory, in which case the system would be connected directly to the waste water source. The waste and treated solution collecting during treatment of a waste water source may also be cycled back to a waste water source, such as a factory, for storage and/or further treatment. Indeed, in some embodiments, the treated water collecting from the treatment tank(s) may be recycled back through the treatment tanks for any number of additional treatment cycles. Waste (in the form of sludge) collected during the treatment process may also be recycled back to the treatment tank(s) if desired, or stored and then recycled back to the treatment tank(s) for later treatment of the same or different waste water sources.

Accordingly, while a particular order of particular treatment processes have been shown and described, those skilled in the art will appreciate that other process orders, arrangements, orientations, etc., may be used to treat waste water, and that the systems and methods described herein are merely illustrative embodiments. As such, this description is to be taken only by way of example and not to otherwise limit the scope of the embodiments herein. It is the object of the appended claims to cover all such variations and modifications as come within the true spirit and scope of the embodiments herein. The drawings are not drawn to scale and are not intended to limit the full scope of the embodiments herein.

What is claimed is:

1. A method for treating flowback fracturing water or produced water comprising:
    adding an oxidizer to a first solution of flowback fracturing water or produced water to create a first mixture;
    spray-atomizing the first mixture into a treatment tank causing a formation of a sludge layer on top of a formation of a treated solution forming in the treatment tank; and
    spray-atomizing additional mixture into the treatment tank that includes at least the sludge layer, where the additional mixture, in response to the spray-atomizing the additional mixture, contacts and interacts with the sludge layer in the treatment tank, wherein the contacting and interacting causes iron species from the additional mixture to be absorbed into the sludge layer causing the production of additional treated solution and additional sludge in the sludge layer, wherein the sludge layer with the additional sludge is on top of the additional treated solution in the treatment.

2. The method of claim 1 further comprising:
    pumping the treated solution and the additional treated solution to a finish tank;
    wherein the sludge layer increases in volume based on the contacting and interacting.

3. The method of claim 1 further comprising maintaining the treatment tank at zero atmosphere during the spray-atomizing.

4. The method of claim 1 further comprising:
    misting the first mixture into a second treatment tank, a third treatment tank and a fourth treatment tank;
    settling the first mixture in the second, third and fourth treatment tanks, wherein a second sludge layer forms in the second treatment tank, a third sludge layer forms in the third treatment tank, and a fourth sludge layer forms in the fourth treatment tank in response to settling the mixture in the second, third and fourth treatment tanks;
    filtering the mixture through the second, third, and fourth sludge layers; and
    pumping a third treated solution, a fourth treated solution and a fifth treated solution to a finish tank.

5. The method of claim 4 further comprising:
interconnecting the treatment tank and the second treatment tank, the third treatment tank, and the fourth treatment tank with a belly line extending across and through a portion of each of the treatment tank, the second treatment tank, the third treatment tank, and the fourth treatment tank, the belly line having an start point and an end point;
running the treated solution, additional treated solution, the third treated solution, the fourth treated solution, and the fifth treated solution through the belly line from the start point to the end point; and
collecting the treated solution, the additional treated solution, the third treated solution, the fourth treated solution, and the fifth treated solution from the end point.

6. The method of claim 5 further comprising pumping the fourth treated solution and the fifth treated solutions out of tops of the third treatment tank and the fourth treatment tank.

7. The method of claim 1 further comprising a venting subsystem wherein gas or vapor is vented from the treatment tank to the venting subsystem.

8. The method of claim 1 further comprising:
pumping the treated solution from the treatment tank directly to one or more filters;
filtering the treated solution using the one or more filters; and
pumping the treated solution from the one or more filters directly to a finish tank.

9. The method of claim 1 wherein the oxidizer is one or more of a hypochlorite, ozone, oxygen, a chlorite, a permanganate, a peroxide, a persulfate, a perborate, a percarbonate, a N-halogenated hydantoin, chlorine dioxide, peracetic.

10. The method of claim 1 wherein the sludge layer is active, self-generating and self-sustaining.

11. The method of claim 10 further comprising maintaining the sludge layer at 8-10 $m^3$.

12. The method of claim 1 wherein the at least one treatment tank is at least two treatment tanks and wherein forming the sludge layer and the treated solution is performed in either a batch sequence or a continuous sequence.

13. The method of claim 1 further comprising adding floatable material to the sludge layer.

* * * * *